United States Patent
Kawahara

(10) Patent No.: US 6,286,328 B1
(45) Date of Patent: Sep. 11, 2001

(54) OVERHEAD TYPE AIR CONDITIONING UNIT FOR VEHICLE

(75) Inventor: Tatsuhide Kawahara, Nishi-kasugai-gun (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/534,316

(22) Filed: Mar. 24, 2000

(30) Foreign Application Priority Data

Apr. 8, 1999 (JP) .................................................. 11-101715

(51) Int. Cl.[7] ...................................................... F25D 21/14
(52) U.S. Cl. .................................................................. 62/285
(58) Field of Search ............................. 62/244, 285, 291; 454/137

(56) References Cited

U.S. PATENT DOCUMENTS

| | | | |
|---|---|---|---|
| 4,679,616 | * | 7/1987 | Ferdows et al. ....................... 62/244 |
| 4,690,209 | * | 9/1987 | Martin ................................... 165/150 |
| 4,898,003 | * | 2/1990 | Ichikawa et al. ...................... 62/244 |
| 5,184,474 | * | 2/1993 | Ferdows ................................. 62/244 |
| 5,605,055 | * | 2/1997 | Salgado ................................. 62/244 |
| 5,791,156 | * | 8/1998 | Strautman et al. .................... 62/244 |

\* cited by examiner

Primary Examiner—William Doerrler
Assistant Examiner—Mohammad M Ali
(74) Attorney, Agent, or Firm—Oblon, Spivak, McClelland, Maier & Neustadt, P.C.

(57) ABSTRACT

An overhead type air conditioning unit for a vehicle of the present invention, having a conditioner casing in which a heat exchanger for air conditioning and a blower are internally installed, and mounted in a ceiling of a passenger component. Furthermore, the air conditioning unit is characterized in that a casing of the blower is molded within the conditioner casing in one body. Therefore, the number of parts and the costs to prepare molds are reduced and expense is decreased.

7 Claims, 16 Drawing Sheets

FRONT SIDE OF THE VEHICLE

OVERHEAD TYPE AIR CONDITIONING UNIT FOR VEHICLE

BACKGROUND OF THE INVENTION

1. Field of the Invention

The present invention relates to an overhead type air conditioning unit for a vehicle, and especially relates to the art to reduce the overall thickness of the air conditioning unit, for improving the mounting capability of the unit in the vehicle.

This application is based on Japanese Patent Application No. Hei 11-101715, the content of which is incorporated herein by reference.

2. Description of the Related Art

Conventionally, in a vehicle such as a limousine, an air conditioning unit can be provided which is exclusively used for rear seats, which consists of a second line or second and third lines of the seats of the vehicle, is mounted. This air conditioning unit is mainly mounted in the ceiling of the passenger component as shown in FIGS. 14 and 15, and is generally referred to as an overhead type air conditioning unit.

A conventional overhead type air conditioning unit is briefly explained as follows with FIGS. 14 to 22.

FIGS. 14 and 15 show an example of the overhead type air conditioning unit (hereafter, called "a rear air conditioning unit") which is provided for a sedan type passenger car. Reference number 1 in these figures indicates the rear air conditioning unit. In this unit, compressed coolant which is compressed by a compressor and has high temperature and high pressure, is cooled by a condenser and is supplied to the rear air conditioning unit 1 and a front air conditioning unit (not shown).

FIG. 15 shows the rear air conditioning unit 1 mounted at the ceiling of the passenger component and is shown from the rear side of the passenger component. The rear air conditioning unit 1 is fixed on body 3 by brackets 2 at both ends. In practice, for preventing the exposure of the mounting members such as the brackets 2, a treatment such as covering these members with an appropriate covering member (not shown) is performed.

Furthermore, in this rear air conditioning unit 1, as shown in FIGS. 16 and 17, improvements such as installing the unit between two reinforcement members 5 which are located at the passenger-component side of roof panel 4 and extend along the width direction, are performed to restrict the projection of the unit into the passenger component as much as possible. This improvement is carried out to secure as much headroom as possible under restricted conditions, to provide a comfortable space in the vehicle.

In succession, the structure of the conventional rear air conditioning unit 1 is briefly explained as follows with reference to FIGS. 18 to 22.

This rear air conditioning unit 1 has a casing 6, and has an evaporator 7 acting as a heat exchanger for air conditioning, and a blower 8 fan for drawing air from the passenger component (i.e., inner air) to pass through the evaporator 7 and blowing the heat-exchanged air into the passenger component, in the casing 6. Reference number 9 shows an inlet opening and a reference number 10 shows an outlet opening in these figures.

In the above disclosed air conditioning unit 1, the casing 6 is divided into two parts, i.e., upper and lower parts (6a, 6b), and units of cross-flow fans 8A as shown in FIG. 19 or units of sirocco-fans 8B as shown in FIG. 20 are employed as the blower 8.

Furthermore, the above disclosed air conditioning unit 1 is mounted in the ceiling of the passenger component and the evaporator 7 to exhaust drainage is internally installed in the unit. Therefore, in this unit, treatment of this drainage is an important matter.

The conventional treatment of the drainage is explained with reference to FIGS. 21 and 22. FIG. 21(a) shows a plan view of a heat exchanger mounting surface of the lower casing 6b, and FIG. 21(b) shows a front view of the lower casing 6b. Commonly, in this unit, the drainage is led to drain openings 11 which are formed on both sides of the lower casing 6b and exhausted to the outside of the vehicle via drain hoses (not shown) connecting to the drain openings. Therefore, the lower casing 6b has a convex curved shape, with its center at the top and both sides located at the bottom, as sown in FIG. 21(b).

Moreover, in the lower casing 6b, the heat exchanger mounting surface which is located at the front side of the vehicle functions as a drainage pan. Furthermore, this surface and a blower mounting surface which is located at the rear side of the vehicle are molded into one body.

The above disclosed air conditioning unit 1 is operated during movement of the vehicle. Therefore, it is necessary to treat the drainage in anticipation of all situations that may occur while traveling. More concretely, it is necessary to prevent the leakage of the drainage into the passenger component even if the drainage moves back and forth because the vehicle climbing or descending or accelerating and decelerating, or even if the drainage moves left and right because the vehicle turns. In the conventional rear air conditioning unit 1, to cope with the above requirement, four drains 18, 19, 20, 21 which are formed by ribs 12, 13, 14, 15 extending along the width direction and ribs 16, 17 extending along the front and rear directions, are provided as shown in FIGS. 21(a) and 22.

Moreover, reference number 22 in these Figures indicates an insulation member which is installed between the lower casing 6b and the evaporator 7 for heat insulation and for protection of the evaporator 7. Moreover, the rib 12 which is located at the front end forms part of the front surface of the casing 6, and the inlet opening 9 opens to the upper side of the rib 12.

The above mentioned rear air conditioning unit 1 is mounted in the ceiling of the passenger component, and therefore, a reduction of the thickness of the unit for the most miniaturization is required to secure headroom for the passenger. Especially, in a sedan type passenger car having a lower height, which corresponds to a one-box car, there is a strong demand for miniaturization of the unit because the height of the passenger component is low.

However, in the conventional rear air conditioning unit 1, the blower 8 which is installed in the casing 6 has an exclusive casing 8a (refer to FIG. 18). Consequently, the space for the casing 8a becomes one obstacle to the miniaturization of the unit.

Furthermore, it is necessary to raise the height of the rib 12 which is located at the front end and forms a part of the front surface of the casing 6 as much as possible, to prevent spillage of the drainage which moves forward by its inertia when the vehicle slows quickly, for example.

However, as disclosed above, the thickness of the rear air conditioning unit 1 is restricted by the location of the unit. Therefore, the opening area of the inlet opening 9 becomes smaller and ventilation resistance increases as the height of the rib 12 is increased. This increase of the ventilation resistance can lead to an increase in both the noise of the rear air conditioning unit 1 and the power consumed by the blower 8.

This present invention is provided in compliance with the above circumstances, and the purpose of the present invention is provide an overhead type air conditioning unit for a vehicle which can handle the drainage securely and miniaturization of the rear air conditioning unit by reducing the thickness of the unit.

SUMMARY OF THE INVENTION

In the present invention, means disclosed as follows are provided to solve the above-disclosed problems.

The overhead type air conditioning unit for a vehicle of the present invention, has a conditioner casing in which a heat exchanger for air conditioning and a blower are internally installed, and is mounted in the ceiling of the passenger component. Furthermore, the air conditioning unit of the present invention is characterized in that the casing of the blower is molded within the conditioner casing in one body.

The blower is preferably a cross-flow fan, and the conditioner casing is preferably divided into two parts, i.e., upper and lower parts, and the casing of the cross-flow fan is composed of a stabilizer portion which is provided in the lower casing and a fan casing portion which is provided in the upper casing.

The overhead type air conditioning unit for a vehicle of the present invention is also characterized in that the heat exchanger is mounted on a heat exchanger mounting surface of the conditioner casing via an insulation member, wall surfaces standing upwardly and extending along a width direction of the vehicle are located at the front and rear sides of the insulation member, and drainage flow passages are formed between said wall surfaces and end surfaces of said insulation member.

The wall surfaces are preferably formed by ribs.

The overhead type air conditioning unit for a vehicle of the present invention is also characterized in that an evaporator is mounted on a heat exchanger mounting surface of the conditioner casing, drainage exhausted from the evaporator is led to a drain opening via a drainage flow pass, and a dividing rib narrowing the width of the drainage flow pass is formed at the drainage flow pass.

The overhead type air conditioning unit for a vehicle of the present invention is also characterized in that a first rib provided by a front end wall of the conditioner casing, second and third ribs located at the front and rear sides of said heat exchanger and extending along a width direction of the vehicle, and a fourth rib for dividing the heat exchanger mounting surface and a blower mounting surface at the back, are formed on the heat exchanger mounting surface of the conditioner casing.

Furthermore, a first drainage flow passage between the first rib and the second rib, a second drainage flow passage between the second rib and the front surface of the heat exchanger, a third drainage flow passage between the rear surface of the heat exchanger and the third rib, and the fourth drainage flow passage between the third rib and the fourth rib, are formed to lead the drainage which is exhausted from the evaporator to drain openings which are located at the both sides; and a dividing rib narrowing the width of the drainage flow passage is formed at the first drainage flow passage.

The heat exchanger is preferably mounted on the heat exchanger mounting surface of the conditioner casing via an insulation member, and spaces which are formed between the end surfaces of the insulation member and the second rib and the third rib, are used as the second drainage flow passage and the third drainage flow passage.

Furthermore, the second rib preferably has a curved shape to approach the first rib at both ends and to separate at the center, and the dividing rib is formed at the central part of the first drainage flow passage.

DESCRIPTION OF THE PREFERRED EMBODIMENTS

Preferred embodiments of the overhead type air conditioning unit for a vehicle concerning the present invention will be presented in the following description taken with reference to the Figures.

Figure 1:
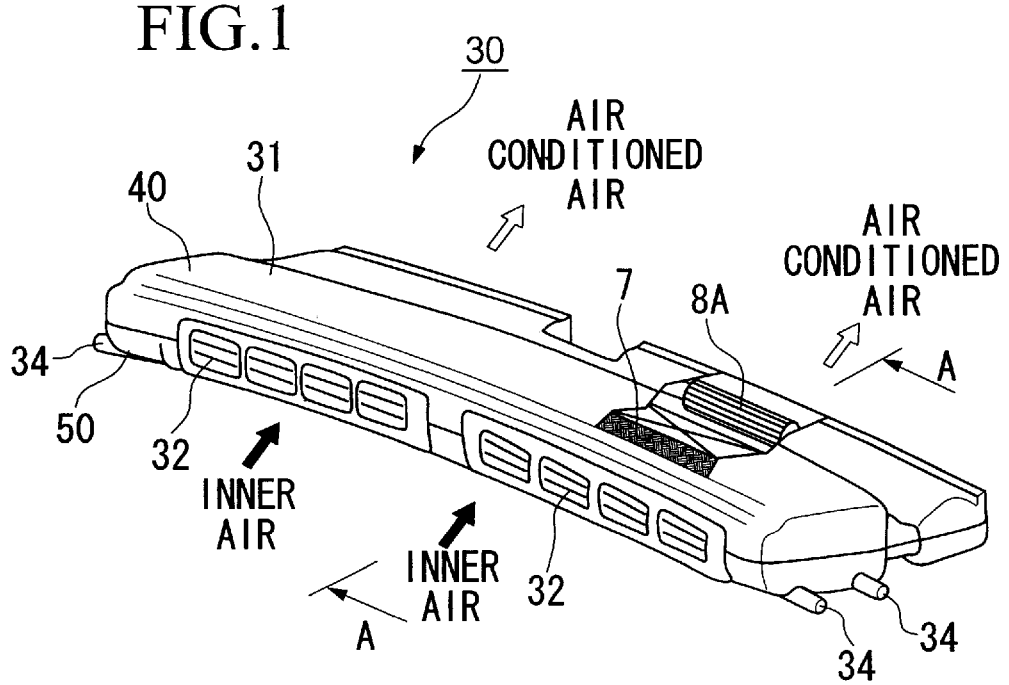
FIG. 1 is an upper perspective drawing with a partial cross-sectional schematic drawing which shows an embodiment of the overhead type air conditioning unit for a vehicle of the present invention.
Figure 2:
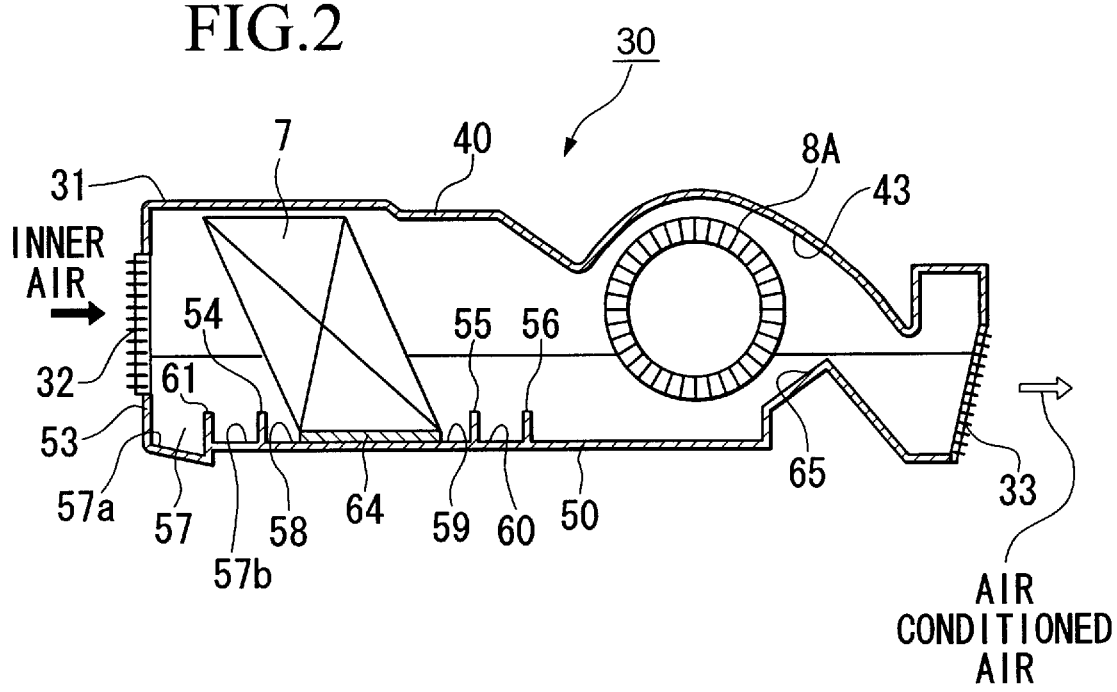
FIG. 2 is a cross sectional drawing of the FIG. 1 taken along line A—A.

In FIGS. 1 and 2, reference number 7 shows an evaporator (heat exchanger), reference number 8A shows a cross-flow fan (blower), reference number 30 shows an overhead type air conditioning unit (hereafter, called "a rear air conditioning unit"), reference number 31 shows a conditioner casing, reference numbers 32 show inlet openings, reference number 33 shows an outlet opening, and reference numbers 34 show drain openings. Further, reference number 40 shows an upper casing of the conditioner casing 31 which is divided two parts, i.e., upper and lower parts, and reference number 50 shows a lower casing of the conditioner casing 31.

Furthermore, in this rear air conditioning unit 30, the evaporator 7 and the cross-flow fan 8A are internally installed in the conditioner casing 31. The inner air is sucked in at inlet openings 32 which are located at the rear side of the vehicle by operation of the cross-flow fan 8A and is heat-exchanged with the coolant which is supplied from the coolant system mentioned below at the evaporator 7. The heat-exchanged air is exhausted to the passenger component from the outlet opening 33 which is located at the rear side of the vehicle, and therefore, the rear air conditioning unit 30 functions as an air conditioner.

Here, the part of the vehicle through the forward direction of the vehicle is called the front side of the vehicle and the rear part of the vehicle is called the rear side of the vehicle.

FIGS. 3 to 6 shows an example of the structure of the lower casing 50.

Figure 3:
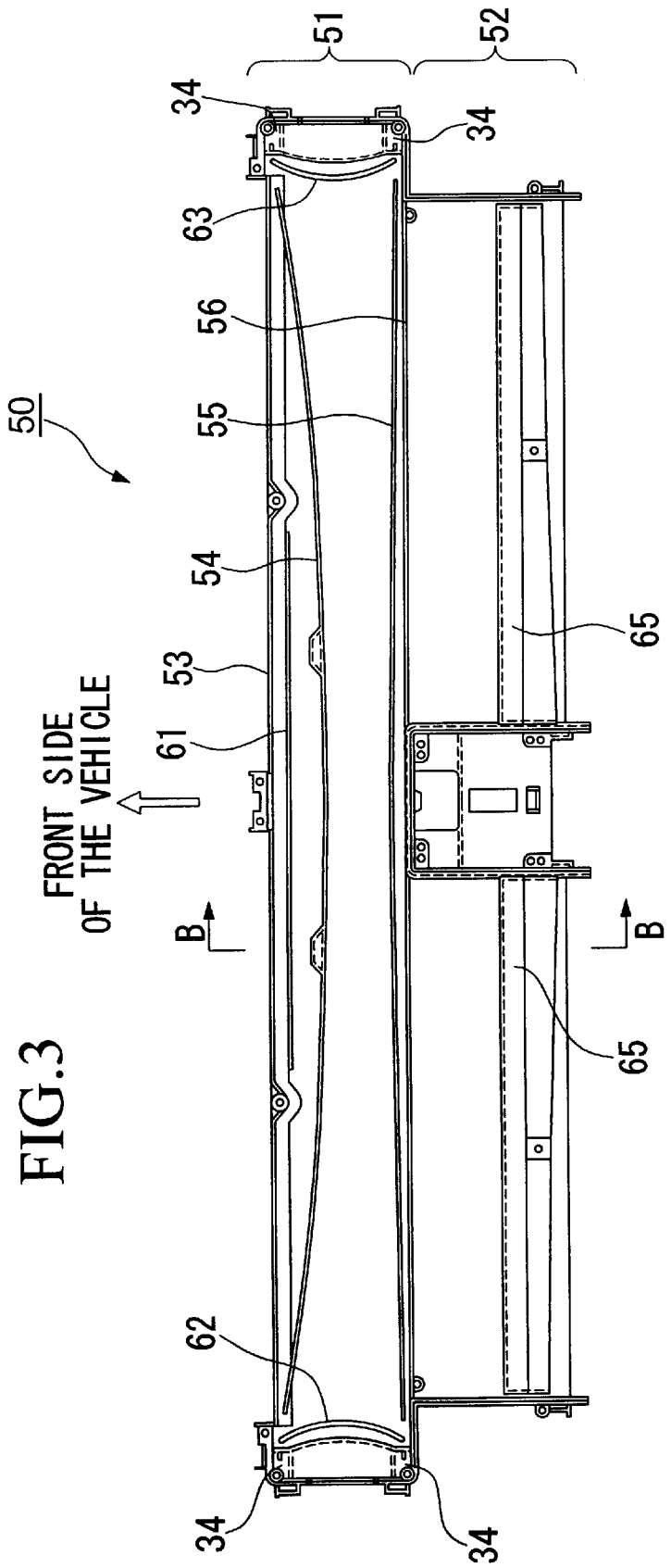
FIG. 3 is a plan view which shows a lower casing of the overhead type air conditioning unit for a vehicle shown in FIG. 1.
Figure 4:
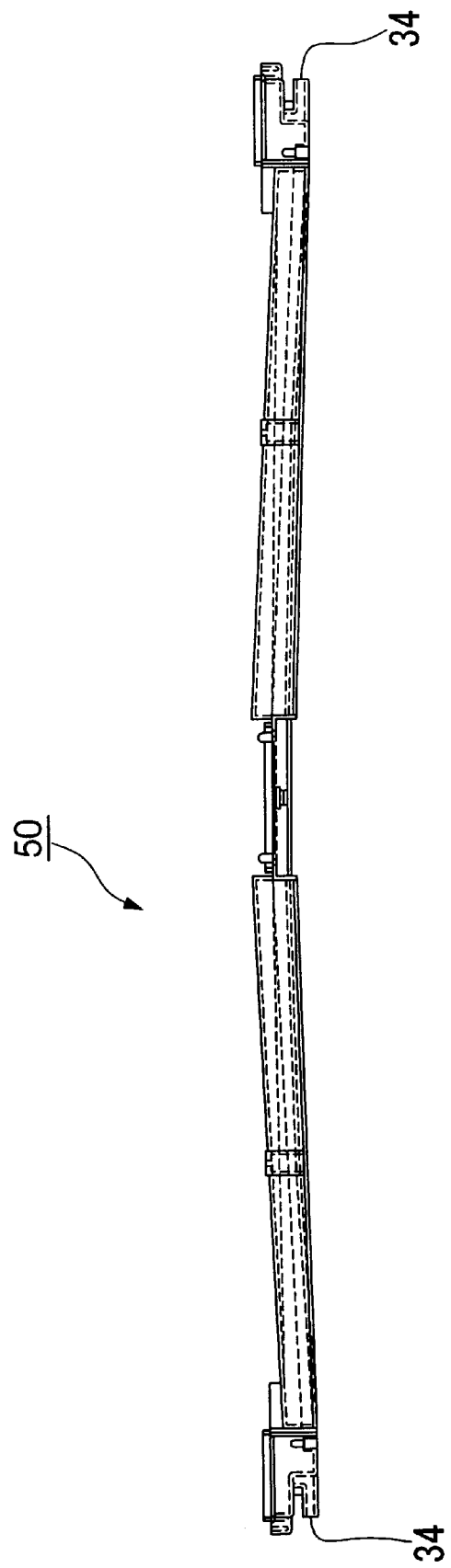
FIG. 4 is a front view (i.e. the view from the rear side of the vehicle) of FIG. 3.
Figure 5:
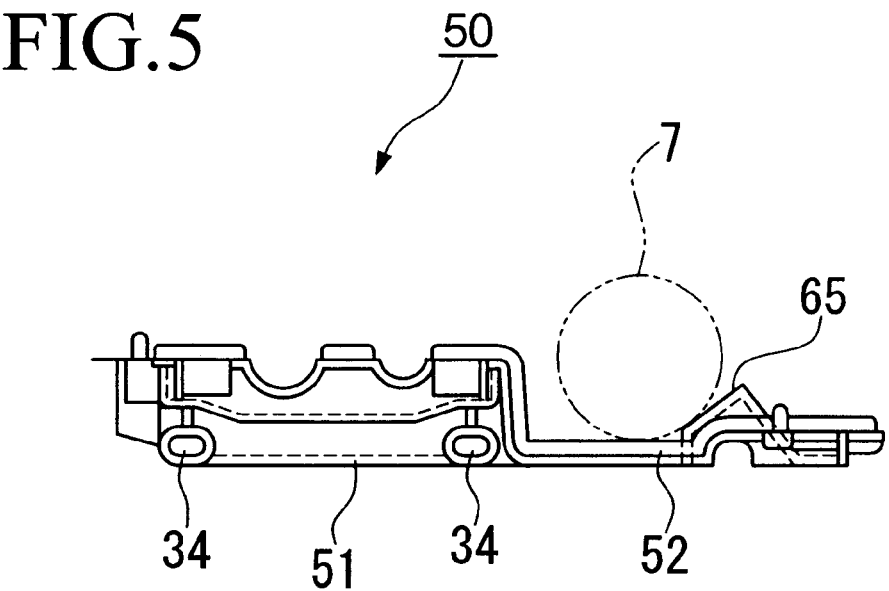
FIG. 5 is a left side view of FIG. 3.
Figure 6:
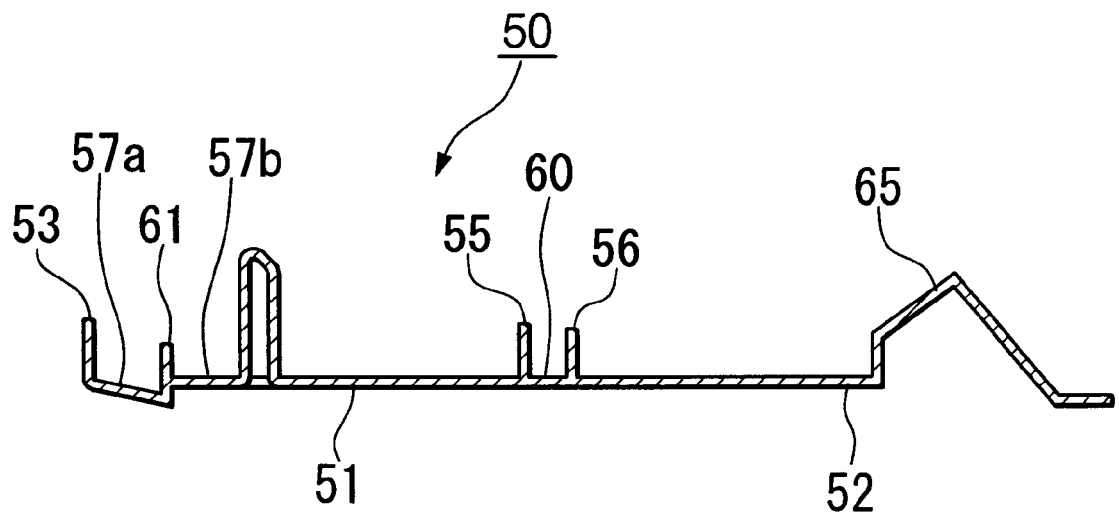
FIG. 6 is a cross section drawing of FIG. 3 taken along line B—B.
Figure 7:
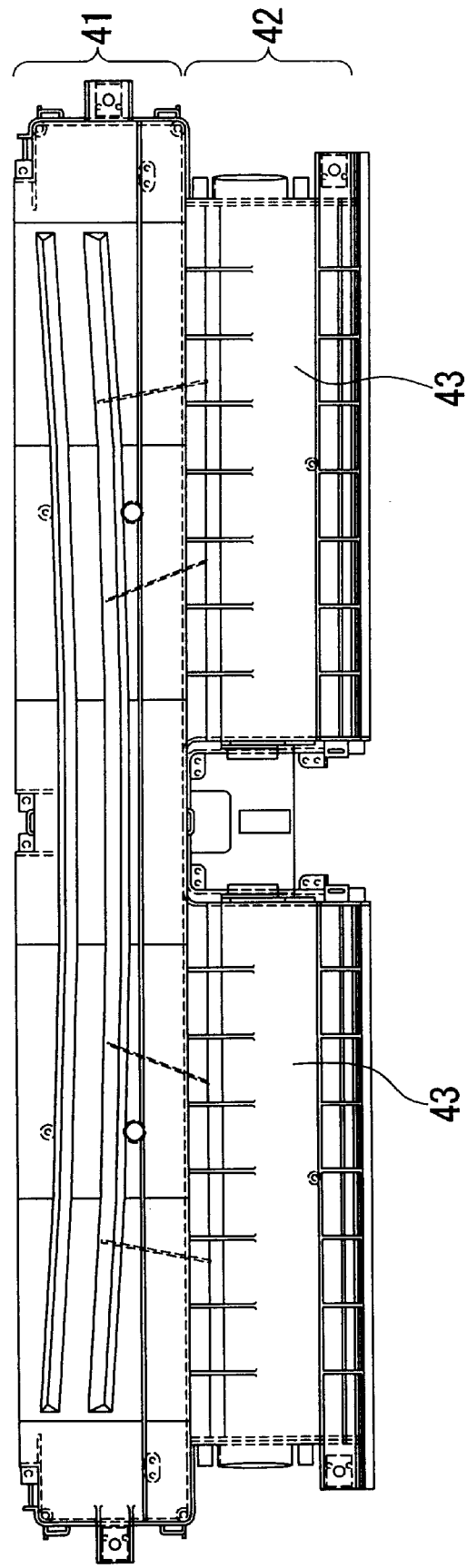
FIG. 7 is a plan view which shows the upper casing of the overhead type air conditioning unit for a vehicle shown in FIG. 1.
Figure 8:
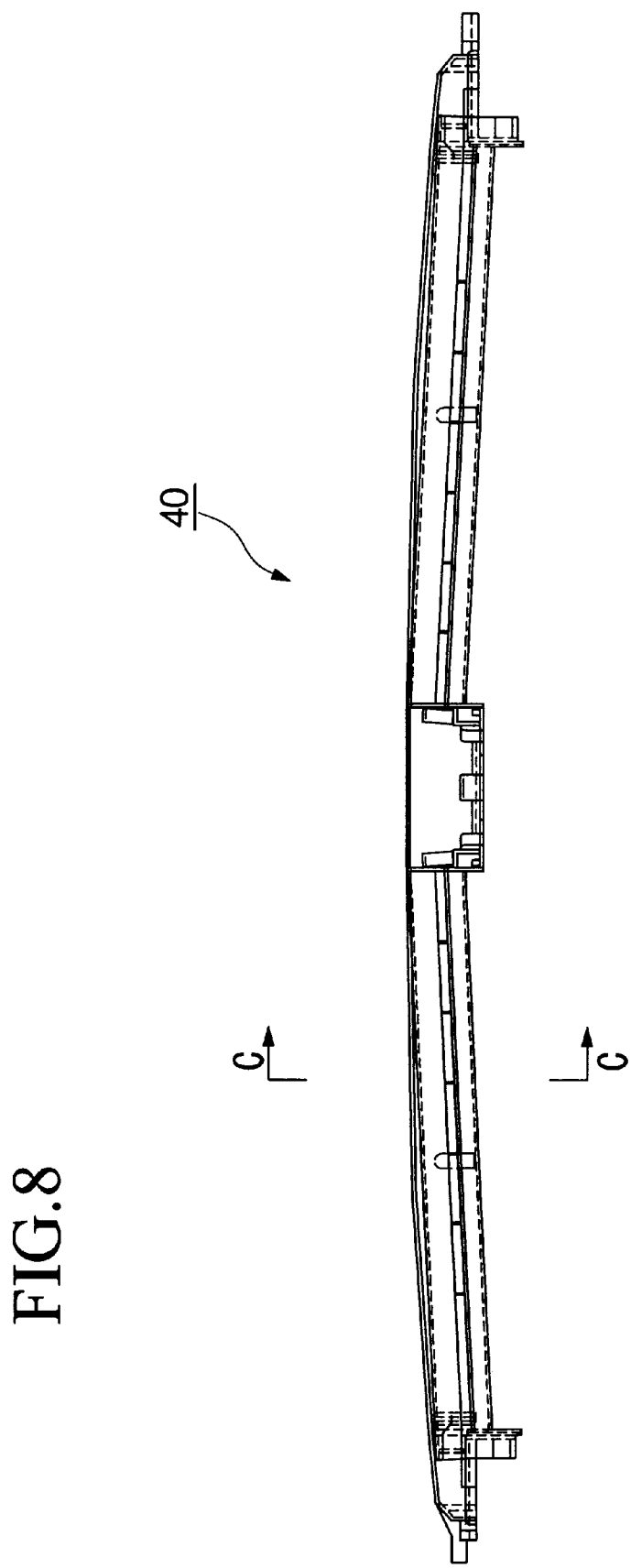
FIG. 8 is a front view (i.e. the view from the rear side of the vehicle) of FIG. 7.
Figure 9:
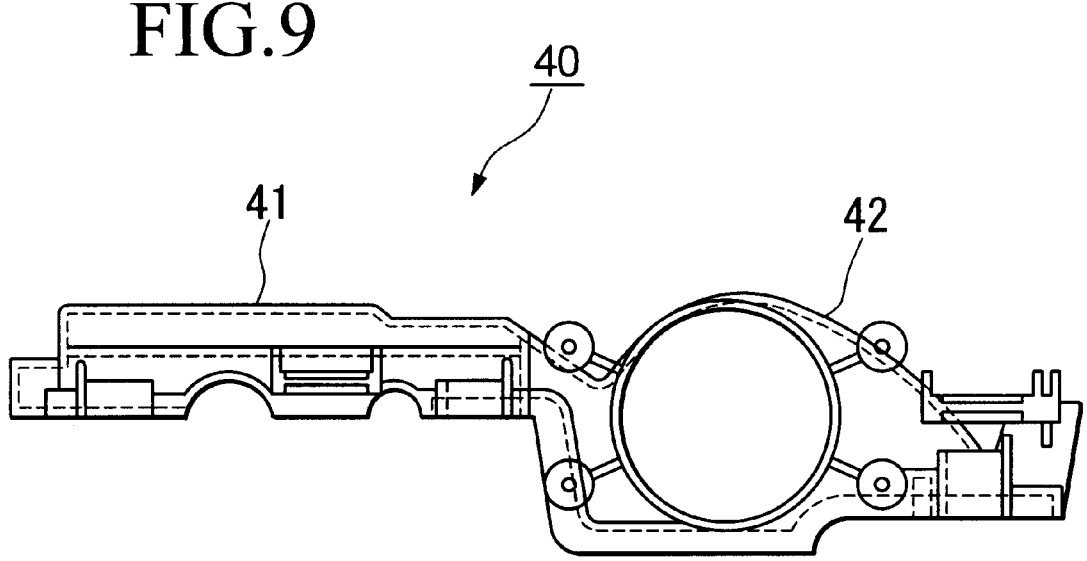
FIG. 9 is a left side view of FIG. 7.
Figure 10:
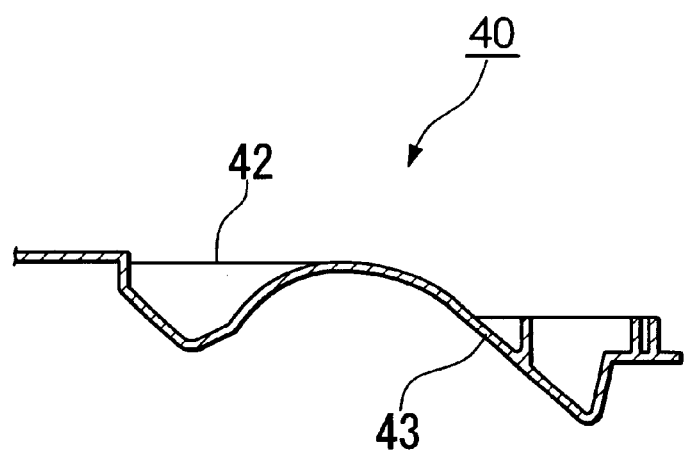
FIG. 10 is a cross sectional drawing of FIG. 8 taken along line C—C.

As shown in the plan view of FIG. 3, the lower casing 50 is composed of a heat exchanger mounting surface 51 which is located at the front side of the vehicle and a blower mounting surface 52 which is located at the rear side of the vehicle.

The heat exchanger mounting surface 51 is an area for mounting the evaporator 7 via an insulation member 64, and also functions as a drainage-pan for handling the drainage exhausted from the evaporator 7. Therefore the heat exchanger mounting surface 51 forms convexly curved shape as a center along the width direction of the vehicle is located at the top for exhausting the drainage from the drain openings 34 which are located at both sides, as shown in the front view from the rear side of the vehicle in FIG. 4.

In the heat exchanger mounting surface 51, a front end wall of the lower casing 50 forms a first rib 53. Furthermore, a second rib 54, a third rib 55, and a fourth rib 56 are formed at the rear side of the first rib 53 in this order. These ribs 53, 54, 55, 56 extend along the width direction of the vehicle. In addition, the second rib 54 has a curved shape to approach the first rib at both ends and to separate at the center. The evaporator 7 is installed between the second rib 54 and the third rib 55, and the second rib 54 and the third rib 55 nearly extend to both sides of the heat exchanger mounting surface 51. Furthermore, both ends of the fourth rib 56 are connected with both sides of the heat exchanger mounting surface 51, and therefore, the heat exchanger mounting surface 51 and the blower mounting surface 52 are divided by the fourth rib 56.

Reference numbers 62, 63 in the figures are water leading ribs. These ribs 62, 63 are extended along the front and rear directions of the vehicle and leading the drainage which flows into both sides of the heat exchanger mounting surface 51 to the drain openings 34 which are located at the front and rear sides, and therefore, the drainage is led to the drain openings 34 smoothly. Furthermore, none of the ends of the above-mentioned second rib 54 and third rib 55 are connected with the first rib 53, fourth rib 56, and water leading ribs 62, 63; and openings are formed which function as flow passages toward the drain openings 34.

Figure 11:
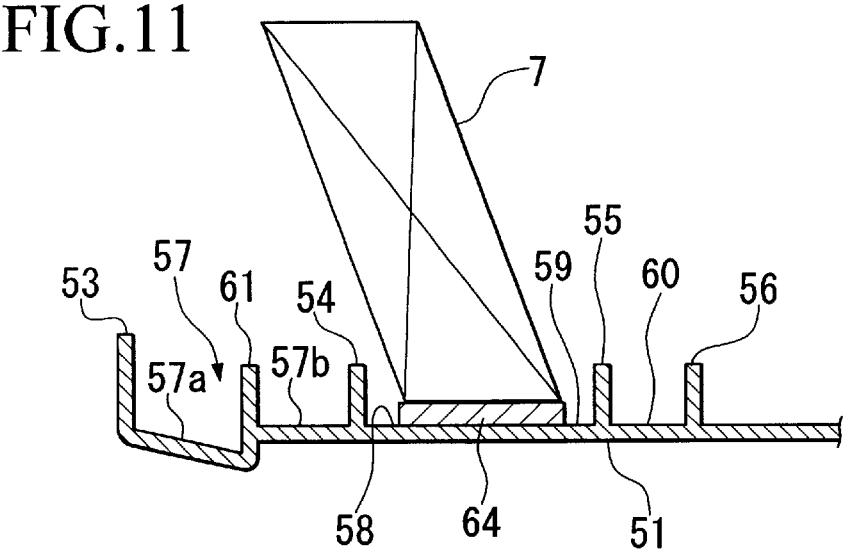
FIG. 11 is an enlarged cross sectional drawing of the drainage flow passages concerning the present invention.

As shown in FIGS. 2 and 11, a first drainage flow passage 57 is formed between the first rib 53 and the second rib 54 and the front surface of the evaporator 7, a third drainage flow passage 59 is formed between the rear surface of the evaporator 7 and the third rib 55, and a fourth drainage flow passage 60 is formed between the third rib 55 and the fourth rib 56. These drainage flow passages function to lead the drainage which is exhausted from the evaporator 7 to the drain openings 34 which are located at both sides. Furthermore, a dividing rib 61 is formed in the first drainage flow passage 57 to reduce the width of the flow passage. This dividing rib 61 is formed at the central part of the flow passage which is relatively wide, and the central part of the first drainage flow passage 57 is divided between a front flow passage 57a which is located at the front side and a rear flow passage 57b which is located at the rear side.

The blower mounting surface 52 is an area for mounting the cross-flow fan 8A. In this embodiment, a pair of left and right cross-flow fans each having a driving motor, are mounted. Furthermore, as shown in the side view of FIG. 5 and in the cross sectional drawing of FIG. 6, lower casing of the cross-flow fan 8A is molded with the blower mounting surface 52 in one body, and reference number 65 shows a stabilizer.

FIGS. 7 to 10 show the upper casing 40. The upper casing 40 forms the conditioner casing 31 together with the above-mentioned lower casing 50.

The upper casing 40 is composed of a heat exchanger mounting area 41 and a blower mounting area 42, similarly to the above-mentioned lower casing 50. The heat exchanger mounting area 41 has a function to hold down and support the evaporator 7 mounted on the heat exchanger mounting surface 51 of the lower casing 50. Furthermore, a fan casing portion 43 which forms the casing of the cross-flow fan 8A together with the stabilizer 65 which is formed on the blower mounting surface 52 of the lower casing 50, is molded with the blower mounting area 42 in one body.

The evaporator 7 is usually mounted on the insulation member 64 which is laid on the heat exchanger mounting surface 51 for heat insulation and protection of the evaporator. This insulation member 64 can fully occupy the area between the second rib 54 and the third rib 55, however, the insulation member 64 is laid to form spaces between the second rib 54 and the third rib 55 in this embodiment. As a result, a second drainage flow passage 58 having a depth corresponding to the thickness of insulation member 64 is formed between the front end surface of the insulation member 64 and the second rib 54, and a third drainage flow passage 59 having a depth corresponding to the thickness of insulation member 64 is formed between the rear end surface of the insulation member 64 and the third rib 55. This means that the rib depth can be an amount corresponding to the thickness of the insulation member 64 in comparison with the case such that the insulation member fully occupies the area, to obtain the same drain capacity.

Therefore, this is one of the reasons for the reduced thickness of the conditioner casing 31. 8A.

Figure 12:
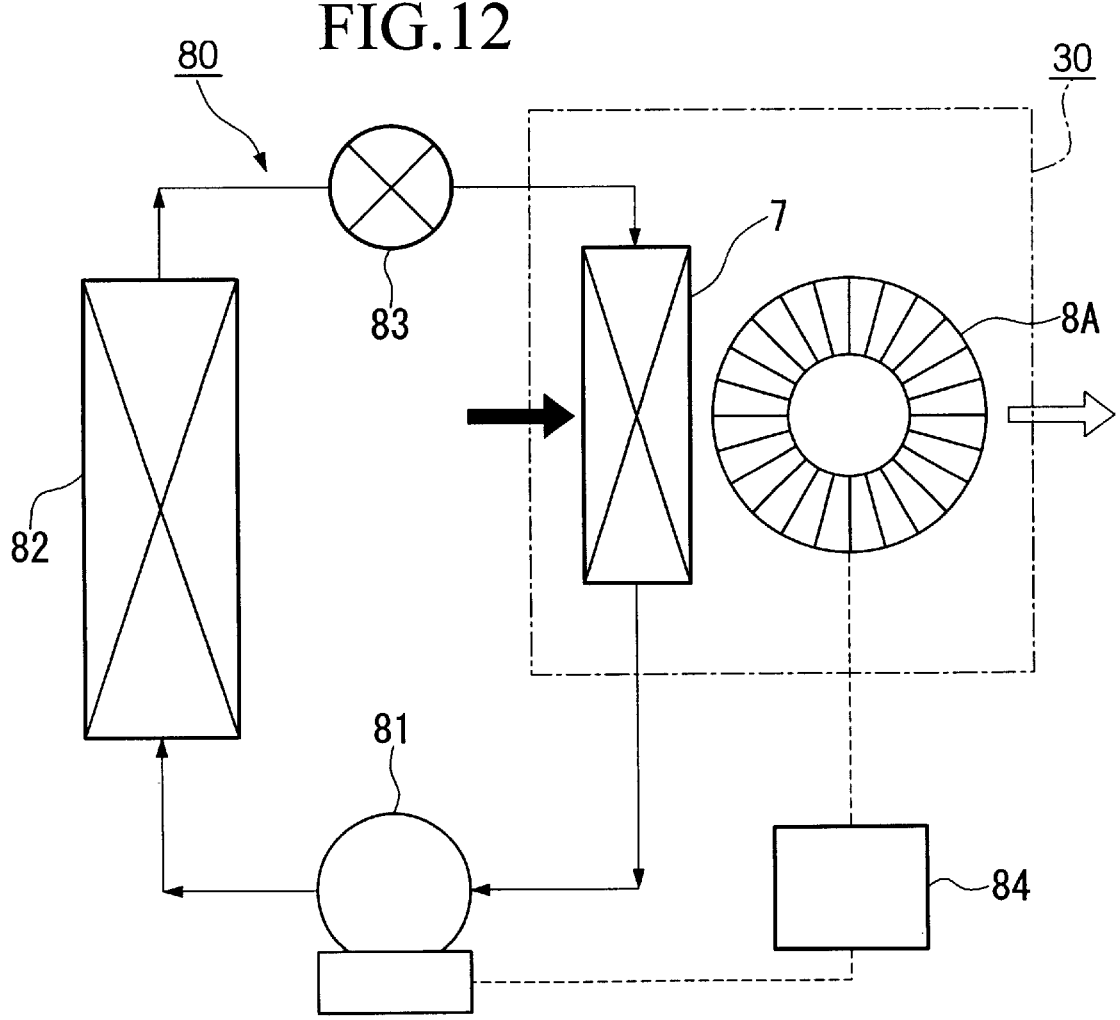
FIG. 12 is a schematic drawing which shows the entire structure of the air conditioning unit for a vehicle.

Next, the structure of the coolant system 80 will be explained with reference to FIG. 12. The coolant system 80 supplies liquid coolant at a low temperature and low pressure to the evaporator 7, and has a compressor 81, a condenser 82 and a swelling valve 83.

The compressor 81 compresses a gas coolant having a low temperature and low pressure to absorb the heat of the passenger component, and is vaporized in the evaporator 7, and sends the coolant to the condenser 82 as a gas coolant with high temperature and high pressure. In this air conditioner for a vehicle, the compressor 81 is driven by an engine via a belt and a clutch.

The condenser 82 is installed in the front part of the engine component, and cools the gas coolant having a high temperature and high pressure which is supplied from the compressor 81 by the outer air, and coagulates and liquefies the gas coolant. A condenser for exclusive use of the rear air conditioning unit 30 can be provided in addition to that for the front air conditioning unit.

The liquefied coolant is sent to the receiver (not shown) to separate the liquid and gas, and is sent to the swelling valve 83 as a liquid coolant with high temperature and high pressure. This liquid coolant with high temperature and high pressure is decompressed and swelled at the swelling valve 83 and is sent to the evaporator 7 as the liquid (mist) coolant with low temperature and low pressure.

In addition, reference number 84 shows a controller to control the temperature of the amount of air put out by the air conditioner.

Figure 13:
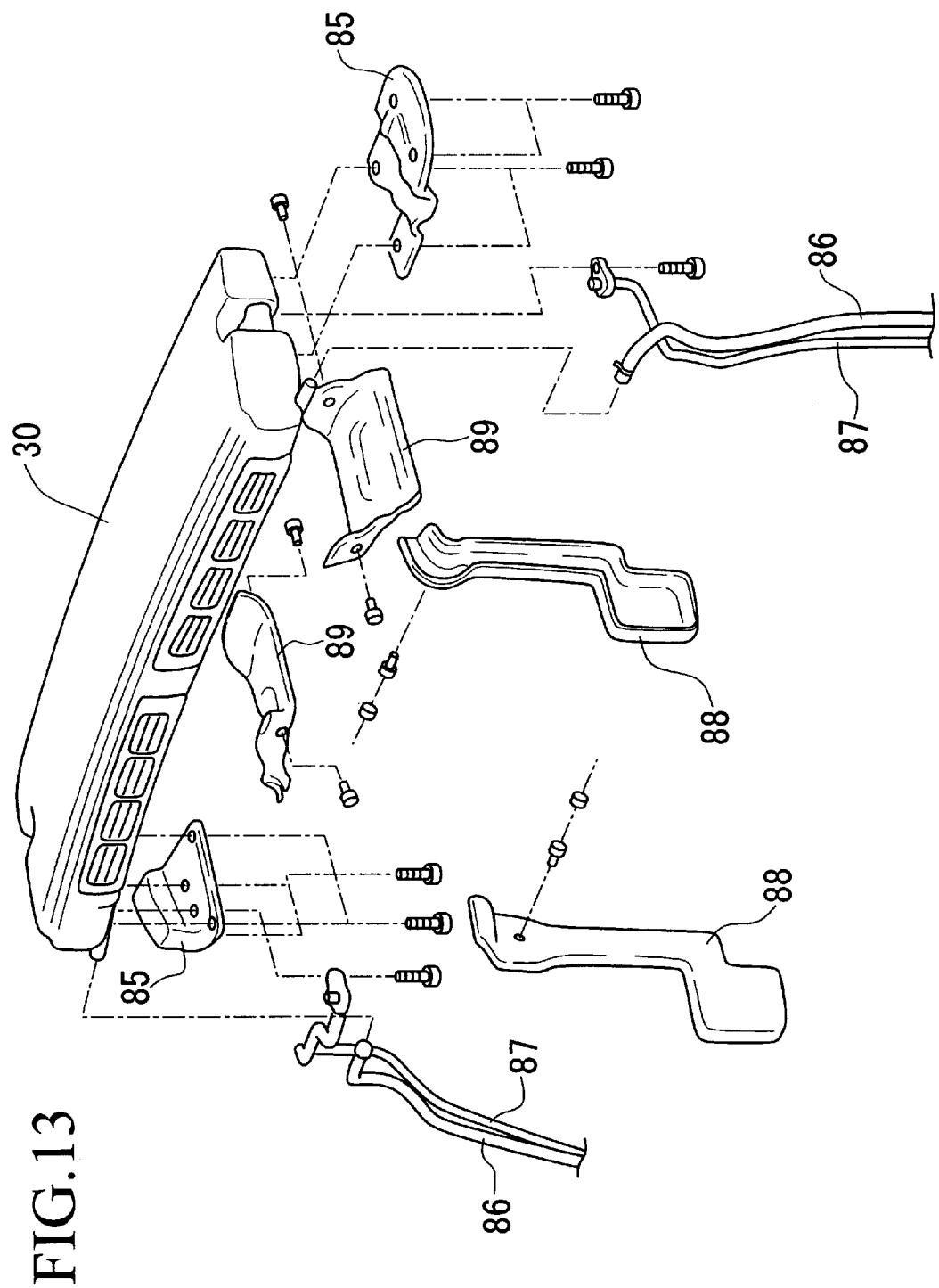
FIG. 13 is an exploded upper perspective drawing which shows an example of the installation structure of the overhead type air conditioning unit for a vehicle.
Figure 14:
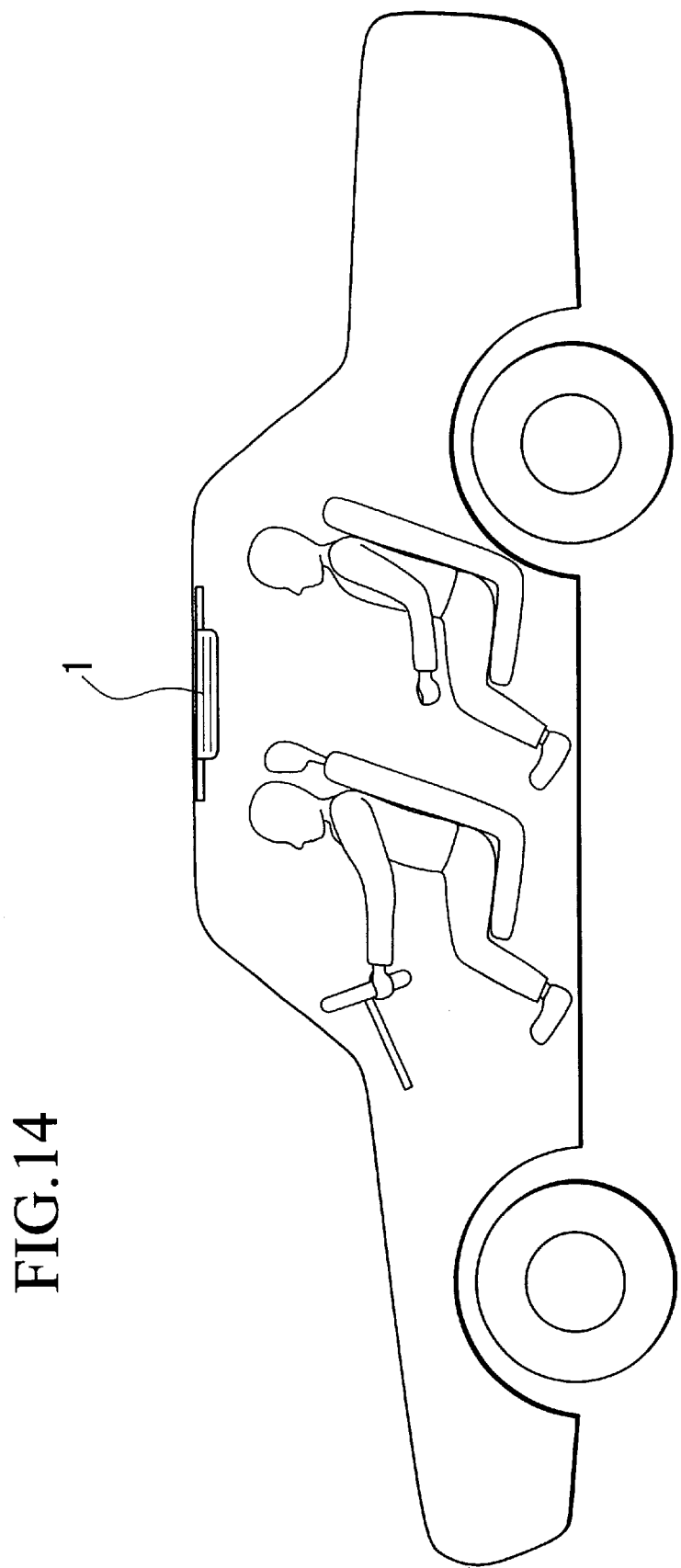
FIG. 14 is a drawing of the overhead type air conditioning unit for a vehicle which is installed in a sedan type passenger car.
Figure 15:
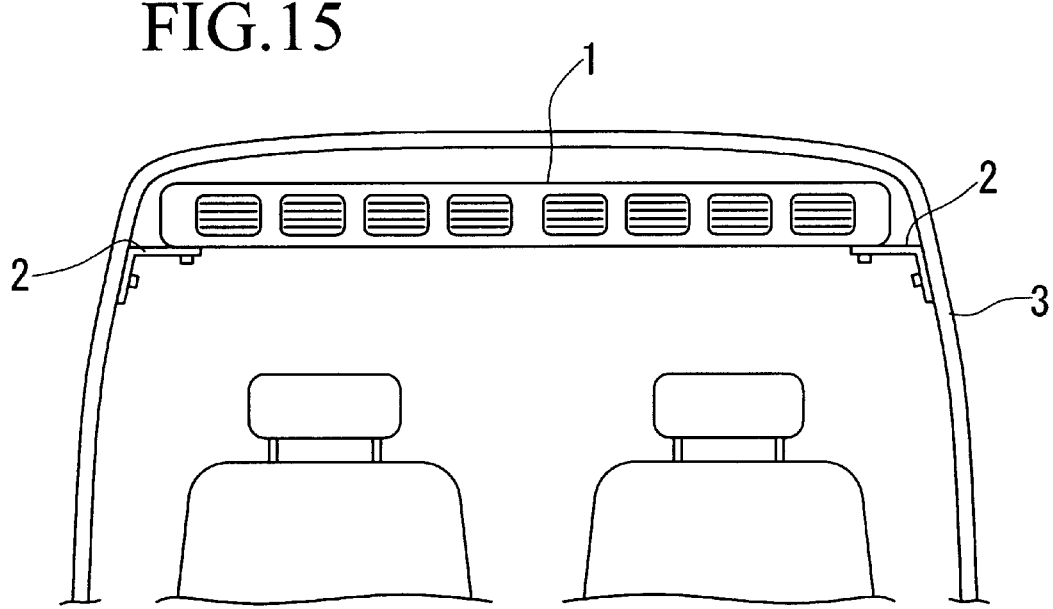
FIG. 15 is a drawing of the overhead type air conditioning unit for a vehicle which is shown from the rear side of the vehicle.
Figure 16:
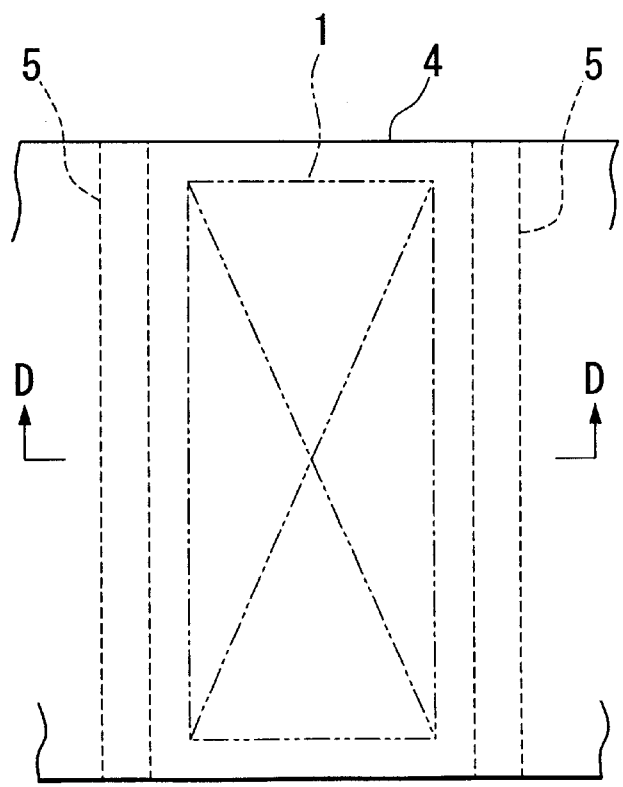
FIG. 16 is a plan drawing which shows the installation position of the overhead type air conditioning unit for a vehicle.
Figure 17:
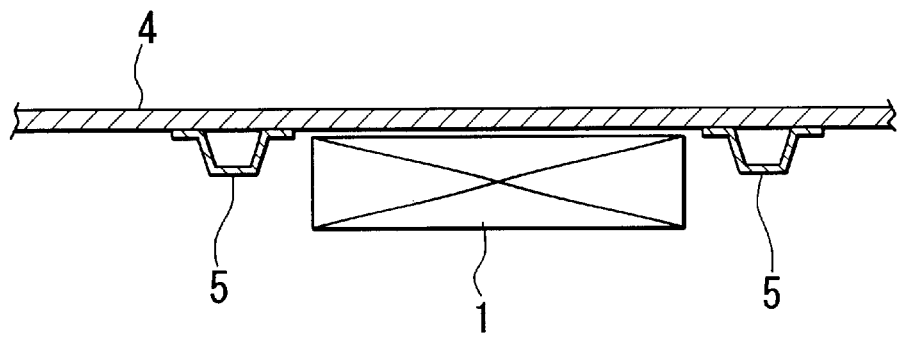
FIG. 17 is a cross sectional drawing of FIG. 16 taken along line D—D.
Figure 18:
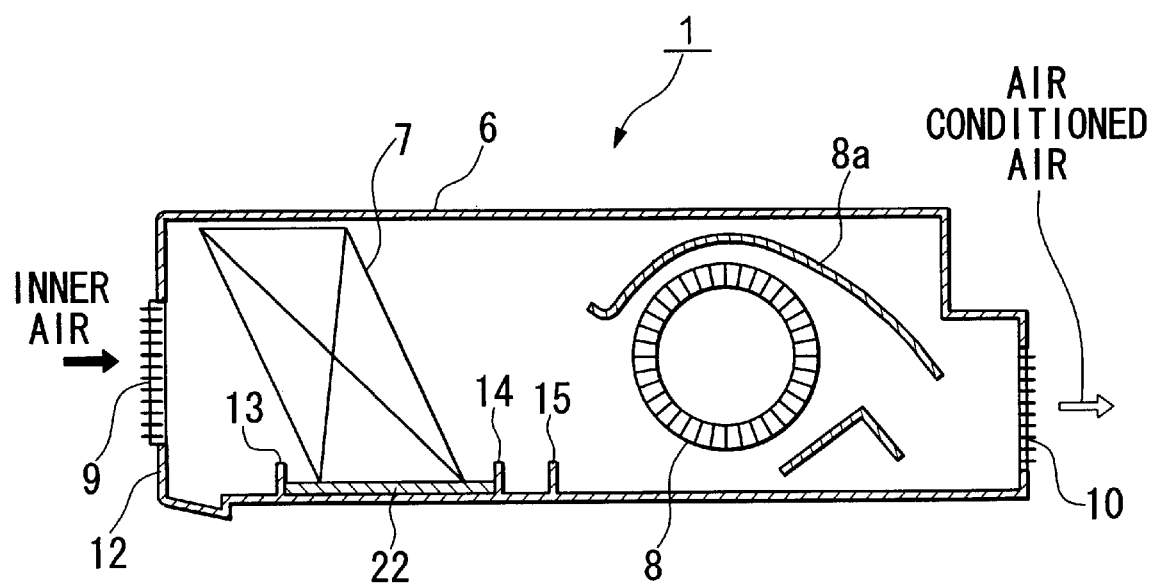
FIG. 18 is a cross sectional drawing of the conventional overhead type air conditioning unit for a vehicle.
Figure 19:
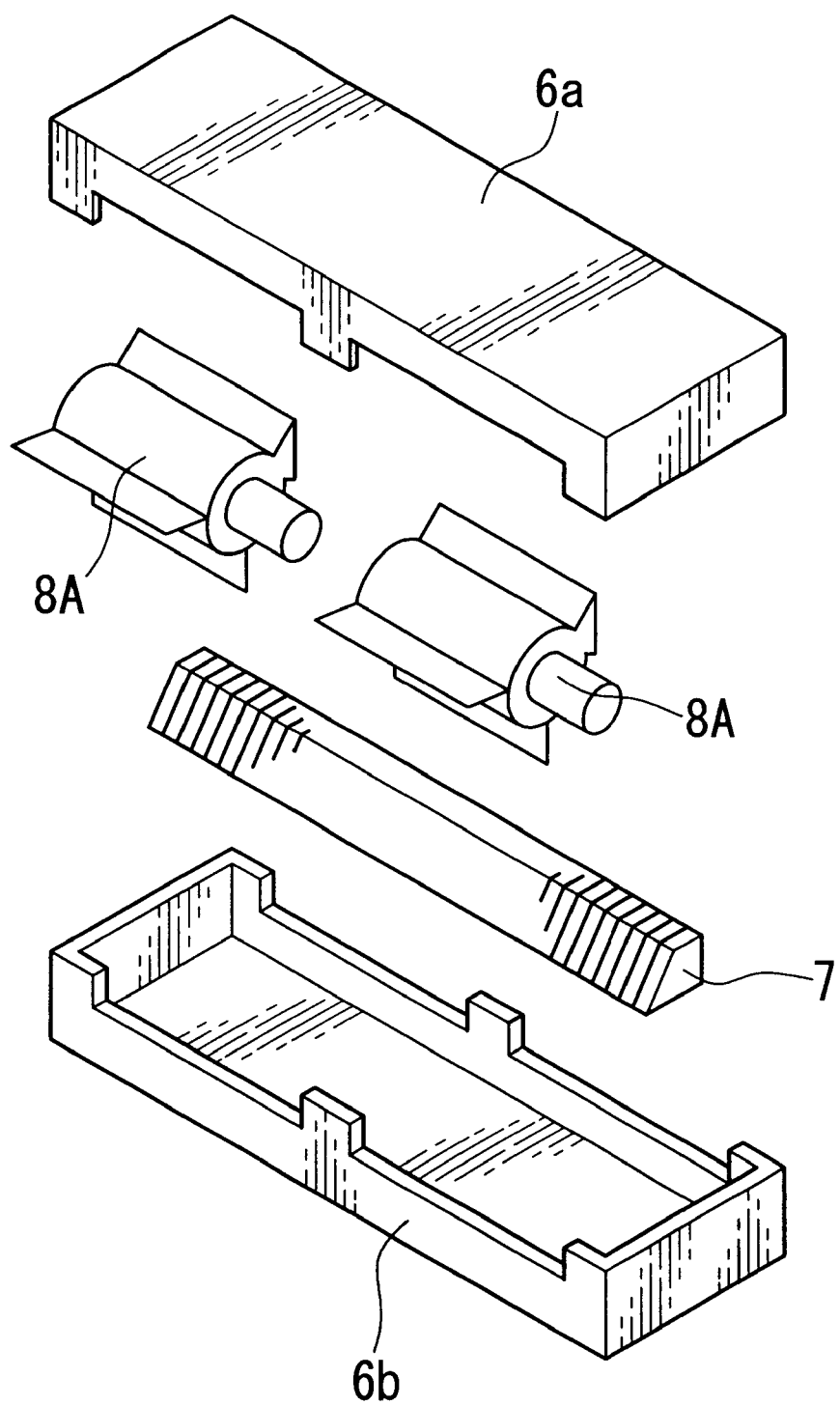
FIG. 19 is an upper perspective drawing with a partially cross-sectional schematic drawing of the main part of the conventional overhead type air conditioning unit for a vehicle which employs cross-flow fans.
Figure 20:
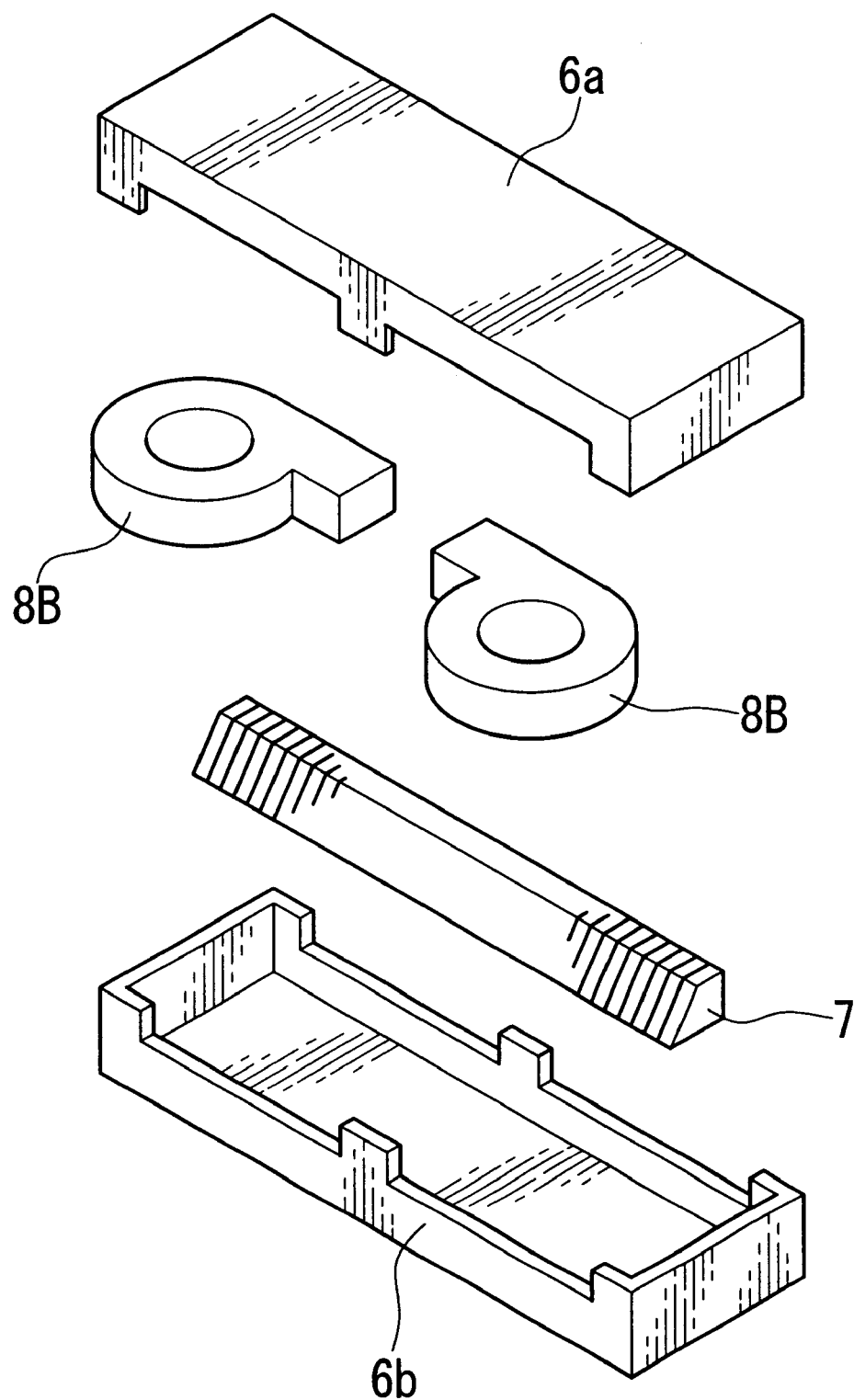
FIG. 20 is an upper perspective drawing with a partial cross-sectional schematic drawing of the main part of the conventional overhead type air conditioning unit for a vehicle which employs sirocco-fans.
Figure 21A:
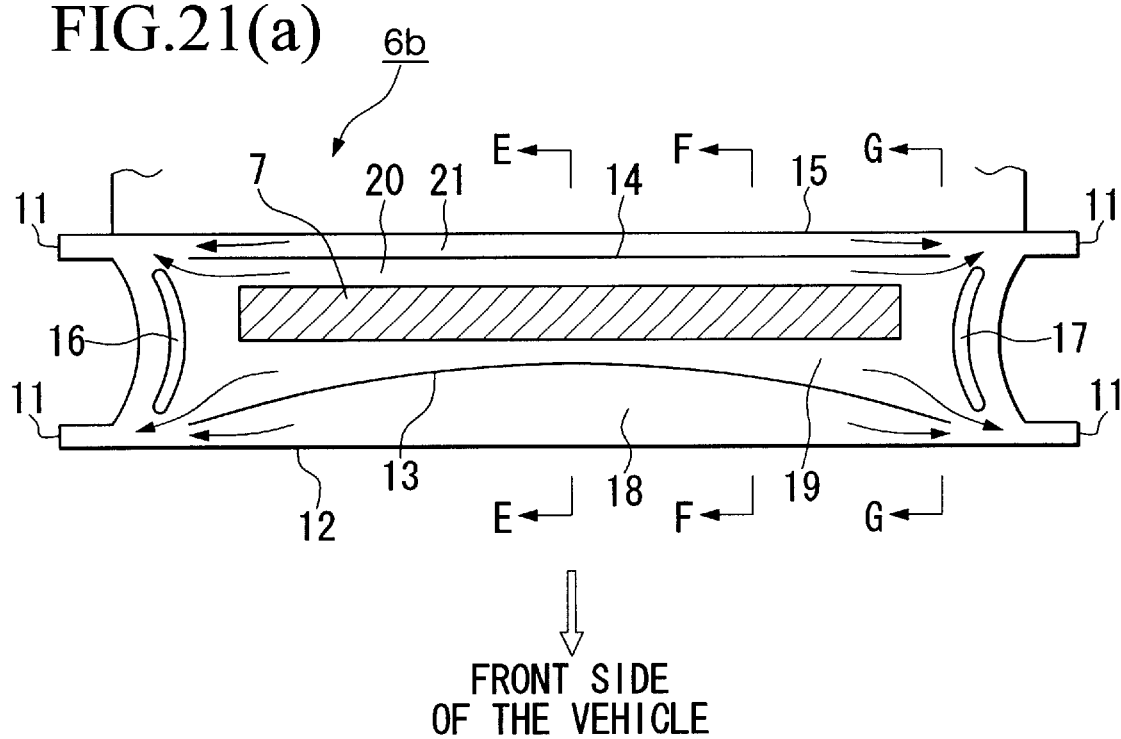
FIG. 21(a) is a drawing of the conventional lower casing which shows a plan view of the heat exchanger mounting surface.
Figure 21B:
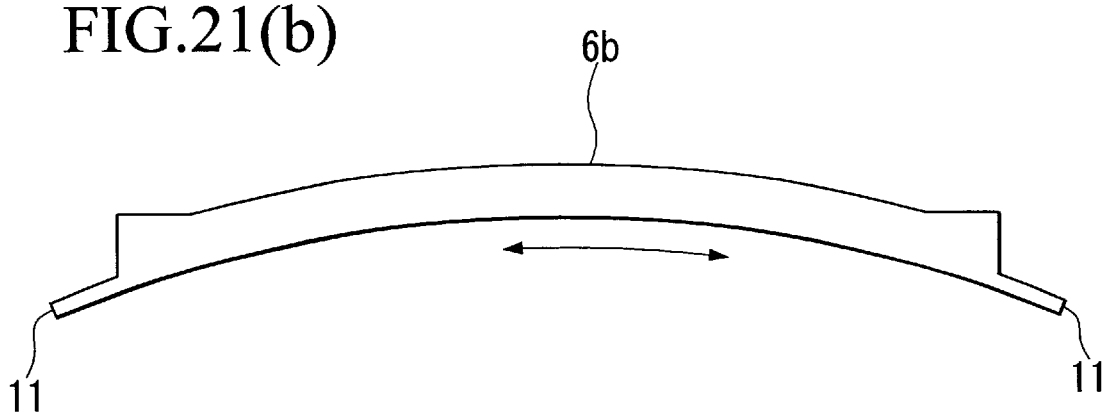
FIG. 21(b) is a drawing of the conventional lower casing which shows a front view of the heat exchanger mounting surface.
Figure 22A:
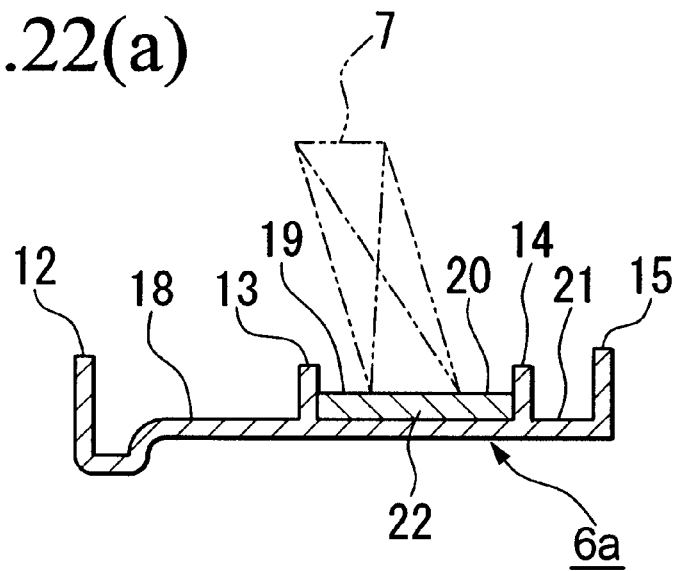
FIG. 22 (a) is a cross sectional drawing of FIG. 21(a) taken along line E—E.
FIG. 22(b) is a cross sectional drawing of FIG. 21(a) taken along line F—F.
FIG. 22(c) is a cross sectional drawing of FIG. 21(a) taken along line G—G.
Figure 22B:
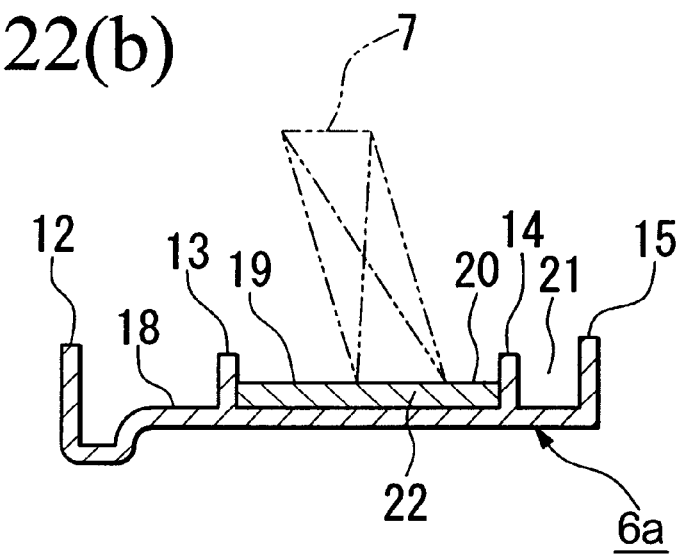
Figure 22C:
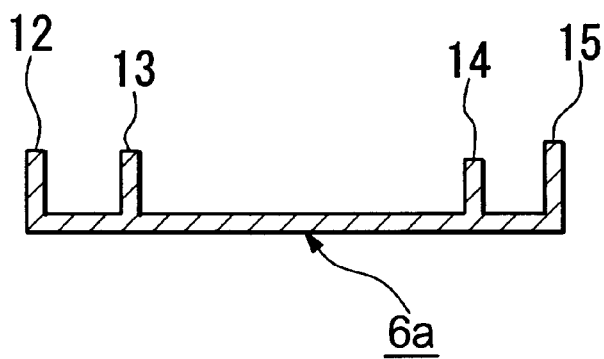

FIG. 13 is an exploded perspective drawing which shows an example of the installation structure of the above-mentioned rear air compressor unit 30 in the vehicle. Reference numbers 85 show a pair of left and right brackets fixing the unit to the frame of the vehicle. Reference numbers 86 show drain hoses to connect the drain openings 34 for exhaust of the drainage to the out of the vehicle. Reference numbers 87 show coolant pipes to circulate the coolant in the coolant system 80. Reference numbers 88 show covers covering the drain hoses 86 and the coolant pipes 87 to prevent their exposure to the passenger component. And reference numbers 89 show covers covering the brackets 85 to prevent their exposure to the passenger component.

The operation of the above-described rear air conditioning unit 30 is explained below.

As explained above, in the present invention, the casing of the cross-flow fan 8A is molded with the conditioner casing 31 in one body, and therefore, a casing exclusively for the cross-flow fan 8A is unnecessary. As a result, the number of parts and the costs to prepare molds is lower and the expense is decreased, and further, it is possible to reduce the weight of the unit. Moreover, the thickness of the rear air conditioning unit 30 can be reduced to about 5–8 mm because a casing exclusively for the cross-flow fan 8A is unnecessary. Furthermore, in the present invention, the cross-flow fan 8A is used as the blower, which is advantageous for reducing the thickness of the rear air conditioning unit 30 for miniaturization. In addition, the advantage of low noise in operation, is obtained because the cross-flow fan 8A is used.

Meanwhile, accuracy of the casing, especially accuracy of the stabilizer 65 and the fan casing portion, are important to secure the capacity of the cross-flow fan 8A. In the present invention, the adjustment between these parts becomes easier because the casing of cross-flow fan 8A is molded with the conditioner casing 31 in one body. That is, in the conventional air conditioning unit, a blower unit has an exclusive casing which is mounted in the air conditioning unit. Therefore, adjustment is required at the assembly of the blower unit and the mounting of the assembled blower unit to the rear air conditioning unit 30, and the assembly of the unit becomes complicated. In contrast, in the structure of the present invention, the adjustment is only carried out once. Therefore, the assembly of the unit is simplified and the processes for assembly are decreased as a whole.

Next, the exhaust of the drainage which is exhausted from the evaporator 7 is explained. The drainage drips from the evaporator 7 and flows into the drain openings 34 which are located at the left and right of the unit, via drainage flow passages 57, 58, 59, 60, which are designed to incline downwards towards both sides. However, the drainage may forcibly move back and forth because of quick starting or braking of the vehicle, or the drainage may forcibly move left and right because of quick turns of the vehicle.

In this case, the drainage forcibly moving left and right may flow out over the ribs which form flow passages. This phenomenon increases with the width (a width along the front and rear directions) of the passages. Especially, if this phenomenon occurs in the first drainage flow passage 57, a serious problem may occur in that the drainage flows out into the passenger component. To cope with this problem, in the present invention, the width of the first drainage flow passage 57 is reduced by the dividing rib 61. Especially, in this embodiment, since the second rib 54 has curved shape to drain the drainage smoothly, the width of the first drainage flow passage 57 is widened at the center. Therefore, the dividing rib 61 is also installed at the center.

As a result, the first drainage flow passage 57 is divided into the front flow passage 57a and the rear flow passage 57b, and the movement of the drainage along the front and rear directions is restricted in narrow areas. Hence, acceleration of the drainage is prevented and the flowing out of the drainage becomes difficult, and therefore, the height of the first rib 53 which is located at the front of the first drainage flow passage 57 can be reduced. Consequently, the rear air conditioning unit 30 can be miniaturized by reducing the thickness of the unit, and the inlet openings 32 can be enlarged in accordance with the reduction in size of the first rib 53.

In addition, the above-described dividing rib 61 can be applied to the other drainage flow passages. For example, if the fourth drainage flow passage is widened, a rib can be installed to prevent the drainage from flowing out into the blower mounting area 52. The rib also can be applied to prevent the movement of the drainage along the width direction of the vehicle, and the prevention of the movement of the drainage along the front and rear directions.

Meanwhile, in the case of the second drainage flow passage 58 and the third drainage flow passage 59, spaces formed between the insulation member 64 and the second rib 54 and the third rib 55 which are respectively located at the front or the rear side of the insulation member, are used as the drainage flow passages 58, 59. The depth of these drainage flow passages is substantially increase in accordance with the thickness of the insulation member 64. As a result, the height of the second rib 54 and the third rib 55 can be reduced in comparison with the case where the insulation member fully occupies the heat exchanger mounting surface. This result can be utilized to reduce the thickness of the lower casing 50 which functions as the drainage-pan, and can be utilized to miniaturize the rear air conditioning unit 30 by reducing the thickness of the unit.

Because of the above-described improvement, the thickness of the rear air conditioning unit 30 is expected to be reduced by about 30 mm.

In the above-explained example, the cross-flow fan 8B is used as the blower, however, the present invention also can be applied to a rear air conditioning unit in which a sirocco fan used as the blower, to handle the drainage.

Furthermore, it is not always necessary to install the ribs to form the drainage passages, because appropriate wall surfaces of the unit can also be used to form the drainage passages.

As described above, according to the structure of the rear air conditioning unit of the present invention, the following advantages are obtained.

1. Since the cross-flow is used as the blower and the casing of the cross-flow fan is molded with the conditioner casing in one body, the number of parts and the costs to prepare the molds are reduced and an expenses are decreased.

Furthermore, this unification of the casing is effective to reduce the weight of the unit and to simplify the assembly of the unit.

2. Because of the unification of the casing, a casing exclusively used for cross-flow fan becomes unnecessary. Therefore, space for the casing of the cross-flow fan is saved and the rear air conditioning unit can be miniaturized by reducing the thickness of the unit.

3. Since the drainage flow passages are formed by the insulation member and the ribs which are located at the front and rear sides of the insulation member, the drainage flow passages are deepened in accordance with the thickness of the insulation member. Therefore, the rear air conditioning unit can be miniaturized by reducing the thickness of the unit in accordance with the reduced size of the ribs.

4. Since the drainage flow passage is narrowed by the dividing rib, the acceleration and the spillage of the drainage due to internal motion is prevented.

Therefore, if the dividing rib is applied to the first drainage flow passage which is located near the inlet opening, the lower casing can be made thin, the rear air conditioning unit can be miniaturized, and both the noise in operation and the consumed power can be reduced because the inlet openings can be enlarged.

5. Since the rear air conditioning unit is miniaturized by reducing the thickness of the unit, a comfortable space can be provided in the passenger component even if the unit is installed in a sedan type passenger car having a passenger component with a low ceiling.

What is claimed is:

1. An overhead type air conditioning unit for a vehicle, which comprises:
   a conditioner casing in which a heat exchanger for air conditioning and a blower are internally installed, and mounted in a ceiling of a passenger component, wherein
      said heat exchanger is mounted on an insulation member positioned on a heat exchanger mounting surface of said conditioner casing, wherein wall surfaces of said casing extend upwardly and along a width direction of the vehicle, said wall surfaces being located at the front and rear sides of the insulating member, and
      drainage flow passages which have a depth corresponding to the thickness of the insulation member are formed between said wall surfaces and end surfaces of said insulation member.

2. An overhead type air conditioning unit for a vehicle according to claim 1, wherein
   said wall surfaces are formed by ribs.

3. An overhead type air conditioning unit for being mounted in a ceiling of a passenger component, of a vehicle, which comprises:
   a heat exchanger,
   a casing having a mounting surface upon which said heat exchanger is located;
   an evaporator mounted on said heat exchanger mounting surface of said conditioner casing;
   a drainage flow passage located on said casing wherein drainage exhausted from the evaporator is led to a drain opening via said drainage flow passage, and
   a dividing rib formed in said drainage flow passage for narrowing the width of the drainage flow passage.

4. An overhead type air conditioning unit for being mounted in a ceiling of a passenger component of a vehicle, which comprises:
   a conditioner casing having a heat exchanger for an air conditioner and a blower positioned therein;
   a first rib formed by a front end wall of said conditioner casing, second and third ribs being located at front and rear sides, respectively, of said heat exchanger and extending along a width direction of the vehicle, and a fourth rib for dividing said heat exchanger mounting surface and a mounting surface for the blower wherein said second and third ribs are formed on said heat exchanger mounting surface of said conditioner casing,
   a first drainage flow passage located between said first rib and second rib, a second drainage flow passage located between said second rib and the front surface of said heat exchanger, a third drainage flow passage located between the rear surface of said heat exchanger and said rib, and a fourth drainage flow passage located between said rib and said fourth rib, said ribs being formed to lead drainage exhausted from the evaporator to drain openings which are located at both sides of said casing, and
   a dividing rib for narrowing the width of the drainage flow passage is located in said first drainage flow passage.

5. An overhead type air conditioning unit for a vehicle according to claim 4, wherein
   said second rib has a curved shape so as to approach first rib at both ends and to be separated therefrom at a center portion thereof, and said dividing rib being formed at a central part of said first drainage flow passage.

6. An overhead type air conditioning unit for a vehicle according to claim 4, wherein
   said heat exchanger is mounted on said heat exchanger mounting surface of said conditioner casing via an insulation member, and
   wherein spaces formed between the end surfaces of said insulation and said second rib and said third rib respectively comprise said second drainage flow passage and said third drainage flow passage.

7. An overhead type air conditioning unit for a vehicle according to claim 6, wherein
   said second rib has a curved shape so as to approach said first rib at both ends and to be separated therefrom at a center portion thereof, and said dividing rib is formed at a central part of said first drainage flow passage.

* * * * *